United States Patent [19]

Torres

[11] Patent Number: 5,680,605
[45] Date of Patent: Oct. 21, 1997

[54] METHOD AND APPARATUS FOR SEARCHING A LARGE VOLUME OF DATA WITH A POINTER-BASED DEVICE IN A DATA PROCESSING SYSTEM

[76] Inventor: Robert J. Torres, 6100 Meadowhill Dr., Colleyville, Tex. 76034

[21] Appl. No.: 385,025

[22] Filed: Feb. 7, 1995

[51] Int. Cl.$^6$ .................................................. G06F 17/30
[52] U.S. Cl. ..................... 395/603; 395/602; 395/604; 395/605; 395/339; 395/352; 395/353; 395/788
[58] Field of Search .......................... 395/603, 604, 395/605, 144, 156, 157, 602, 788, 352, 353, 339

[56] References Cited

U.S. PATENT DOCUMENTS

| | | | |
|---|---|---|---|
| 4,805,099 | 2/1989 | Huber | 364/300 |
| 4,859,995 | 8/1989 | Hansen et al. | 340/710 |
| 5,008,847 | 4/1991 | Lapeyre | 364/709.16 |
| 5,019,806 | 5/1991 | Raskin et al. | 340/706 |
| 5,058,046 | 10/1991 | Lapeyre | 364/709.16 |
| 5,099,426 | 3/1992 | Carlgren et al. | 364/419 |
| 5,187,776 | 2/1993 | Yanker | 395/157 |
| 5,285,785 | 2/1994 | Meyer | 128/653.1 |
| 5,302,968 | 4/1994 | Heberle | 345/131 |
| 5,317,680 | 5/1994 | Ditter, Jr. | 395/135 |
| 5,414,471 | 5/1995 | Saitoh et al. | 348/565 |
| 5,459,831 | 10/1995 | Brewer et al. | 395/155 |
| 5,471,611 | 11/1995 | McGregor | 395/604 |
| 5,485,174 | 1/1996 | Henshaw et al. | 345/123 |
| 5,544,051 | 8/1996 | Senn et al. | 364/419.19 |
| 5,604,892 | 2/1997 | Nuttal | 395/500 |

FOREIGN PATENT DOCUMENTS

| | | |
|---|---|---|
| 0449569 | 10/1991 | European Pat. Off. . |
| 0609030 | 8/1994 | European Pat. Off. . |
| 3908684 | 9/1990 | Germany . |

*Primary Examiner*—Thomas G. Black
*Assistant Examiner*—Jean R. Homere
*Attorney, Agent, or Firm*—Gunn & Associates, P.C.

[57] ABSTRACT

The present invention is directed to a pointer-based query formulation methodology for use with a computer having a pointer-based device associated therewith. The method of the present invention provides the user with a displayed n-grid of n-tuples of keys in a display window of a display device where the n-tuples of keys are attributes associated with the data set to be searched. Once the data set to be search has been selected and the n-grid generated and displayed, the user can use the pointer-based device to select one or more grid elements or n-tuples. The method then converts the selected grid elements into a search query that is then applied to the data set and the data entries containing or matching the search query are accumulated and displayed in a second display window for user review. The method can further include techniques for query refinement by activating a refinement procedure associated with each grid element using either a hot corner in a cursor magnifier or using an active window associated with the grid cursor. The refinement causes the generation and display of a refined grid comprising all trinary and ternary combination tuples containing the selected n-tuple of the original n-grid.

16 Claims, 7 Drawing Sheets

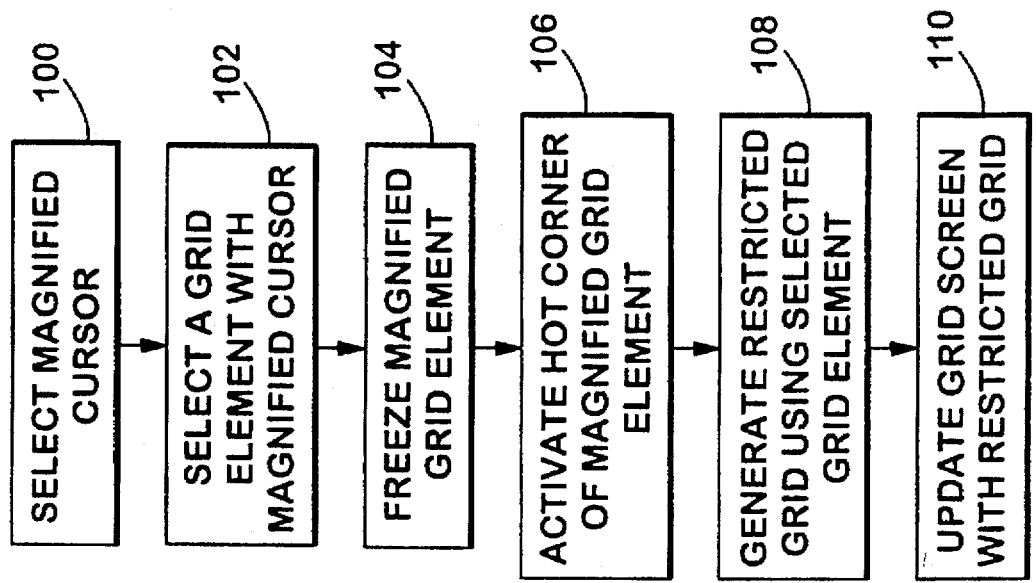
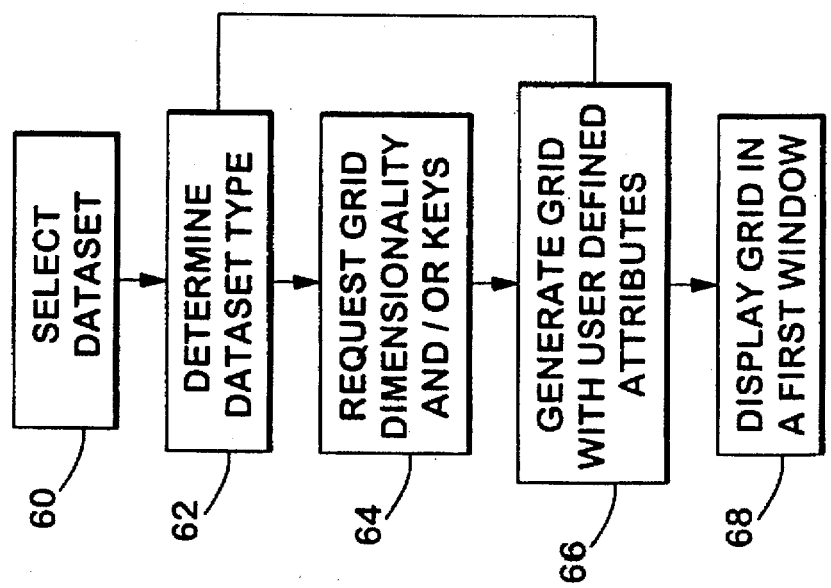

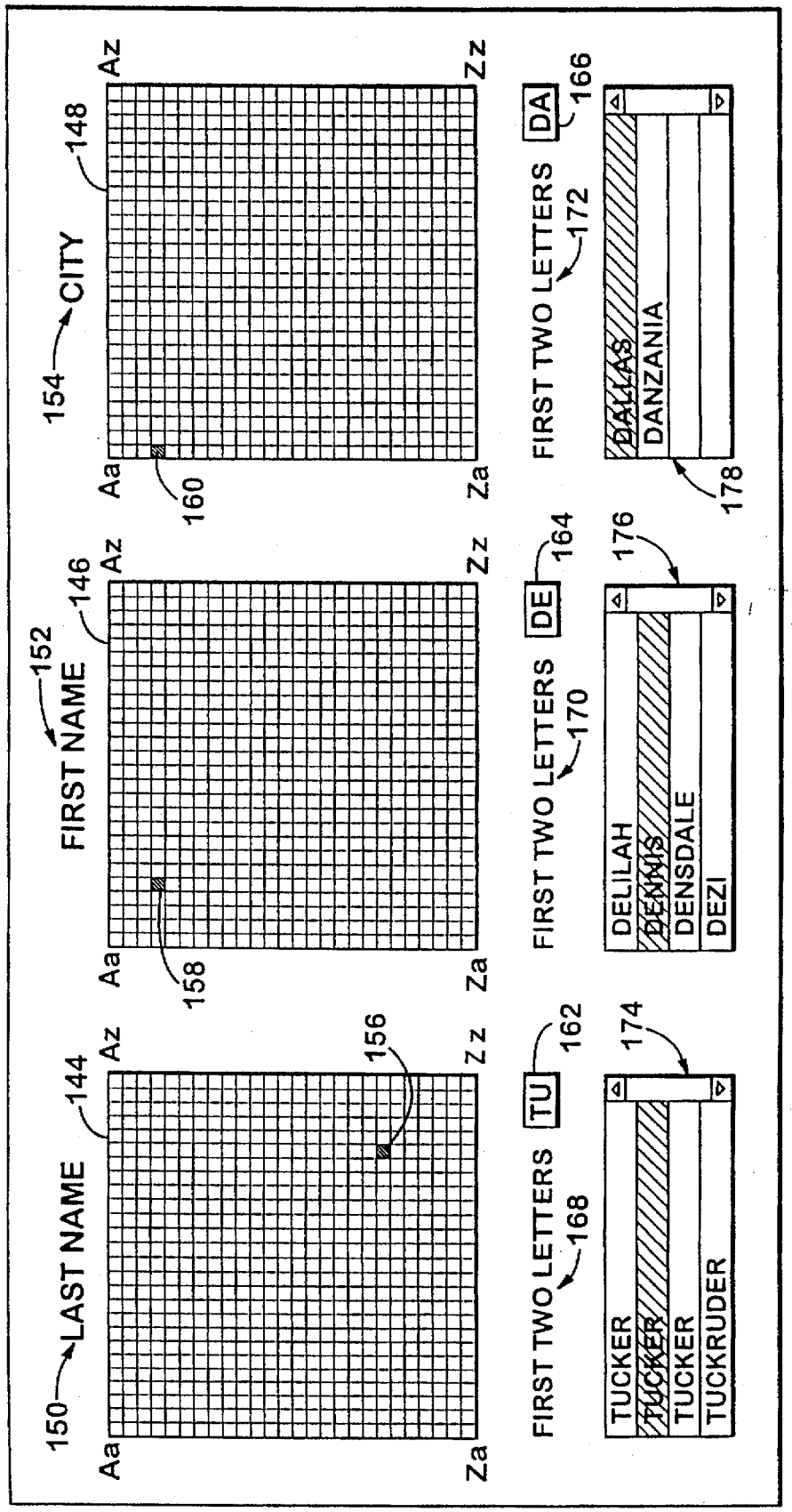

METHOD AND APPARATUS FOR SEARCHING A LARGE VOLUME OF DATA WITH A POINTER-BASED DEVICE IN A DATA PROCESSING SYSTEM

FIELD OF THE INVENTION

The present invention relates generally to data processing systems and, more particularly, to a method for searching large volumes of data using a pointer-based technique to eliminate cumbersome simultaneous use of both a keyboard and a pointer-based device in formulating and executing a search query.

More particularly, the present invention relates to a method for searching large volumes of data using a grid made of a plurality of n-tuples search keys where one or more of the pairs can be selected by a pointer-based device, such as a mouse. The selected pairs are then converted into a query to search a list of elements and the elements that contain the selected pair(s) are retrieved and displayed for review by a user.

BACKGROUND OF THE INVENTION

Prior art search techniques for determining whether a given text string or key string occurs in a given text list or key list have involved either the use of only keyboard generated commands or a combination of keyboard and pointer-based device-generated commands. Typically, the pointer-based device-generated commands are used in association with pull down menus or other similar techniques to identify a given data set that a user desires to search for the occurrence of a given key-pair and/or string. Once the data set has been identified, the user is generally required to generate a query by typing the query using the keyboard commands. Thus, a user is forced to coordinate the use of both input media to select a data set, construct a query, and search the data set with the query. This requirement for dual input devices is becoming more and more prevalent as the computer-using community switches to window based user interfaces where pointer-based devices are a necessity.

A window management system provides many of the important features of modern user computer interfaces. A window management system allows multiple applications to interact with the user on a single computer display, and provides low level functions for the application to display data and collect input from the user. The window management system permits application programs to show results in different areas of the display, to resize the screen areas in which those applications are executing, to pop-up and to pull-down menus. The window management system is a resource manager in much the same way that an operating system is a resource manager, only the types of screen area to various applications that seek to use the screen and then assists in managing these screen areas so that the applications do not interfere with one another. The window management system also allocates the resources of interaction devices to applications that require a user input and then routes the flow of input information from the devices to the event queue of the appropriate application for which the input is destined.

The look and feel of the user computer interface is determined largely by the collection of interaction techniques provided for it. Designing and implementing interaction techniques for each individual application would be a time consuming and expensive task. Furthermore, each application would end up with a different look and feel making it difficult for a user to move from one application to another. Applications sharing a common window management system can utilize a common interactive technique toolkit built for the window management system to assure a common look and feel. An interactive technique toolkit consists of a set of subroutines that provide different types of display objects.

Interactive technique toolkits, which are subroutine libraries of interaction techniques, are mechanisms for making a collection of techniques available for use by application programs. By using interactive technique toolkits, a consistent look and feel among application programs sharing a common window management system can be insured. Using the same toolkit across all applications is a commonly used approach for providing a look and feel that unifies both multiple applications and the window environment itself. Interactive technique toolkits are available for specific windowing management systems. For instance, the menu style used to select window operations should be the same style used within all applications. Basic elements of the toolkit can include menus, dialog boxes, scroll bars, file selection boxes and the like, all which can be conveniently implemented in windows.

The X Window System is an example of a window management system that can be used in association with the present invention. One of the most important features of this type of window management system is that it supports device independence by separating the interactions with the display, keyboard and mouse from the rest of the system. This type of windowing system has three basic parts: a library of routines at the lowest level; a framework which allows the application developer to combine components from the library to produce a complete user interface; and an interactive toolkit that supports a set of user interface components known as widgets and include such things as scroll bars, menus and buttons.

The architecture of this type of window management system is based on the client-server model. A single process, known as the server, is responsible for all input and output devices. The server creates and manages all windows on the screen, produces text and graphics, and handles input devices such as the keyboard and mouse. The server implementation is independent of any application but is hardware specific. In a typical environment the application is a client and uses the services of the server via a network connection using an asynchronous byte stream protocol. Multiple clients can connect to the same server. The server hides the details of the device-dependent implementation of the server from the clients.

A window manager process allows the user to control the size and location of windows on the screen. These operations are generally performed by a window man, another client application. In this configuration, it is possible for the window manager to get events pertaining to the resizing or moving of windows from the server independent of the notification of these events to the application. The window manager acts independently from the application and, together with the server, may cause the user interface to be modified without the application being involved.

The windows system requires that the application developer be intimately familiar with operation of the windows system including the library, framework, the toolkit, the window manager, and the server. The complexity of the windows system and the expertise required makes user interface development more costly and can result in longer application development cycles using more resources. The complexity of the windows system results in code that is more difficult to write, error prone and difficult to maintain.

Even with the use of windowing management systems, there is still no effective procedure for search query formulation and query refinement using only a pointer-based device. Thus, there is a need in the art for an effective and efficient methodology for pointer-based data set selection, query formulation, query refinement, search execution, and search result display and manipulation.

SUMMARY OF THE INVENTION

The present invention provides a method for searching a data set using a pointer-based device which involves selecting the data set to be searched, forming an n-grid representing n-tuples of keys associated with the data, and displaying the n-grid with optional key-labeled axes or index grid queues in a first display window. Once the data set is selected and the n-grid is displayed, the user can direct a cursor associated with a pointer-based device into the grid and select one or more grid elements, i.e., n-tuples of keys. The selected grid elements are then formulated into a query. The formulated query is then used to search the data set entries for matches, i.e., entries that contain the selected n-tuples. The matches or hits are then accumulated in a display list and displayed in a second window on the display screen. The user can then scan and select the display list for the exact element(s) desired.

The method of the present invention can further include steps for magnifying a grid element or a cluster of elements associated with a given grid element when scanned by a cursor to provide guidance to a user in selecting n-grid locations for query formulation. This invention can further include steps for narrowing or refining the search field by activating an n-grid refinement either by a hot corner of a grid element magnifier or by using an active window associated with the grid cursor which causes the present invention to generate and display a reduced or refined n-grid comprising refined tuples containing all associated trinary and ternary combinations of the selected n-tuple and all other n-tuples associated with the original n-grid.

BRIEF DESCRIPTION OF THE DRAWINGS

For a more complete understanding of the present invention and the features and advantages thereof, reference is now made to the Detailed Description in conjunction with the attached Drawings, in which:

FIG. 2 depicts a flow diagram for search grid construction and display.

FIG. 5 depicts a flow diagram for activating a query refinement.

FIG. 8 illustrates an example of a multi-grid search grid and result window layout.

DETAILED DESCRIPTION OF A PREFERRED EMBODIMENT

Figure 1:
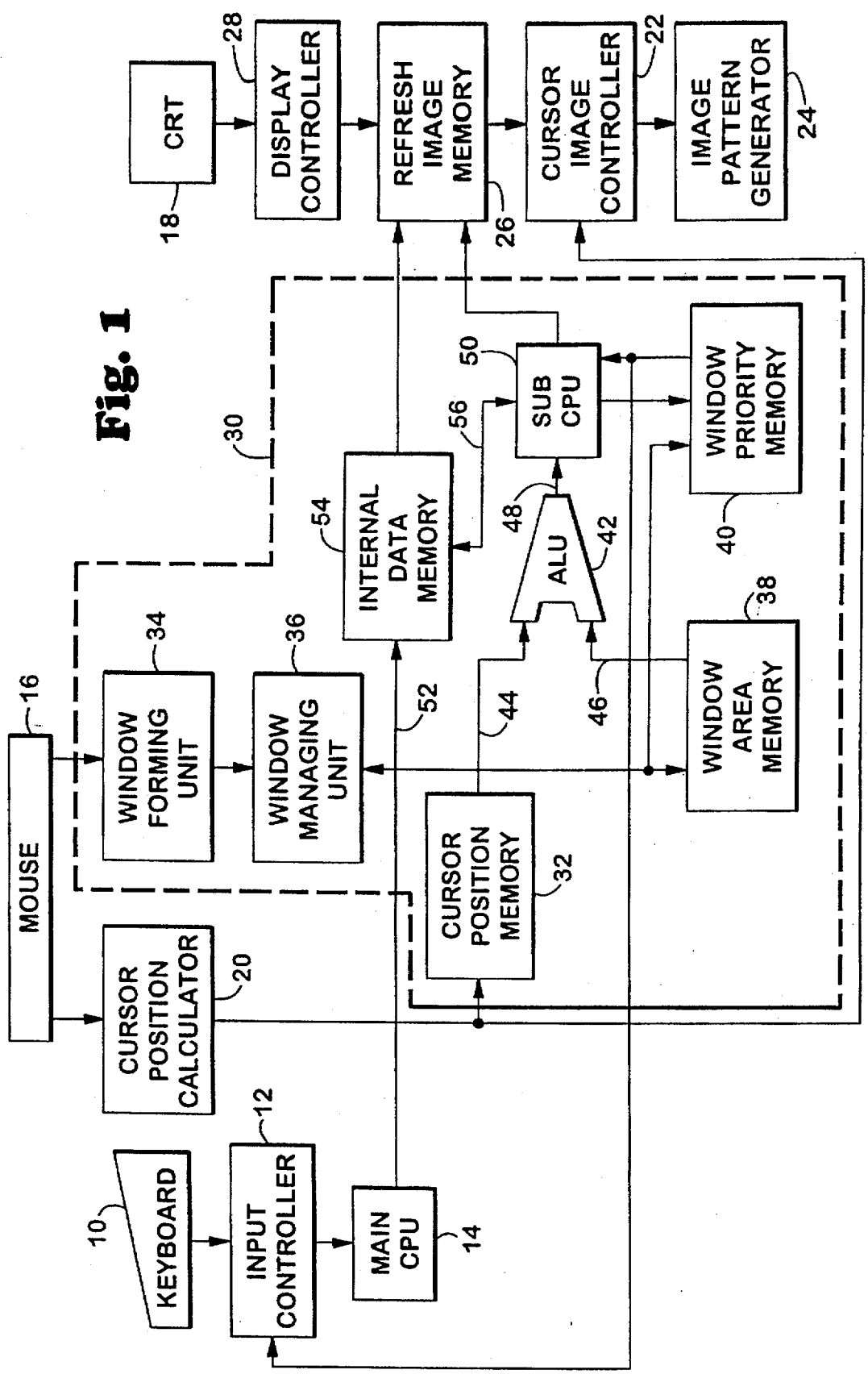
FIG. 1 is a schematic block diagram of the overall arrangement of a workstation that includes a multiwindow presentation control device.

The inventors have developed an efficient pointer-based query system for searching large volumes of data without resorting to the concurrent use of both a keyboard and a pointer-based device. The methodology implemented by the present inventors utilizes an n-grid where each grid element is an n-tuple of keys and where the keys represent search attributes of the data. For example, for searching text-based lists, a 2-grid is used with the keys representing the letters of the alphabet. Thus, a user selects a text data list to be searched and the program displays a 26 by 26 grid where each grid element represents a two letter string, i.e., an alphabetic key-pair. By selecting a given grid element (two letter string), the user signals the program to formulate a query based on the selected grid element, i.e., two letter string. The program then searches the data for the occurrence of that string in the data entries. The query can be tailored to look only for occurrence of the selected string in the first two positions of each data entry or broadened to look for its occurrence anywhere in each data entry.

In the case of graphic data, the keys may represent different graphic primitives such as circles, lines, squares, etc. In the case of other data, the keys may be associated with any attribute of the data such as color, depth, height, width, frequency, amplitude, etc. Of course, for practical reasons 2-grids and 3-grids are preferred; higher order grids are more difficult to display and/or visualize.

Of course, the data set must be in a machine readable format, i.e., it must be an existing data set in an accessible computer memory or mass storage device. Most commonly, the data set will be accessible on a mass storage device such as a disk or tape drive. The entire data set can then be called into memory upon selection or some portion thereof as it is needed. These operations are well known in the art.

The present invention is design to operate in an environment that has windowing capabilities associated with it. Although this environment if greatly preferred, one of ordinary skill should realize that the invention could be implemented by the inclusion of routines that would performed the windowing services needed without having an actual window management system. Even in such as environment, the basic routines that would be necessary can be adequately addressed by describing a window management system.

A window management system provides many of the important features of modem user computer interfaces. A window management system allows multiple applications to interact with the user on a single computer display, and provides low level functions for the application to display data and collect input from the user. The window management system permits applications to show results in different areas of the display, to resize the screen areas in which those applications are executing, to pop-up and to pull-down menus. The window management system is a resource manager in much the same way that an operating system is a resource manager, only the types of resources differ. The window management system allocates the resources of screen area to various applications that seek to use the screen and then assists in managing these screen areas so that the applications do not interfere with one another. The window management system also allocates the resources of interaction devices to applications that require user input and then routes the flow of input information form the devices to the event queue of the appropriate application for which the input is destined.

A window management system typically has two important parts, the first is the window manager with which the end user interacts to have windows created, resized, moved, opened, closed and so on. The second is the underlying functional component, the window system, which actually causes windows to be created, resized, moved, opened, closed and so on. The window manager can be built on top of the window system. The window manager uses services provided by the window system. The window manager is to its underlying window system as a command line interpreter is to the underlying operating system kernel. Applications are built on top of the window management system. The applications built on the window management system are sometimes called clients, which in turn use the capabilities of the window management system, itself, sometimes called the server program. In some client/server window management systems, such as the X Window system, the window manager itself appears to the window system as just another client program. In other systems there is a closer relationship between the window manager and the window system than there is between a client and server. Note that multiple clients are supported by a single server, versus linked code which requires a one to one relationship. The client/server model permits clients and servers to execute on different platforms, communicating via interprocess communications or other interconnecting means. The use of interprocess communications allows computation intensive applications to reside on a powerful computer while the user interacts with the application from a workstation. In this regard, the client/server model is just a sophisticated instance of a virtual terminal protocol; such protocols, in general, share this advantage.

A window management system does not need to be built on the client/server model. For instance, the Macintosh™ has no well defined separation between the window manager and the window system. Such separation was not necessary for the single active process, single processor design of the Macintosh™, and would have led to additional runtime overhead. Of course, in window management systems that provide for the use of interprocess communications between the window manager and the window system, such as X Windows, News and Andrew, the interface must be designed to minimize communication delays.

Applications sharing a common window system can utilize a common interactive technique toolkit built for the WMS to assure a common look and feel. An interactive technique toolkit consists of a set of subroutines that provide different types of display objects. Interactive technique toolkits, which are subroutine libraries of interaction techniques, are mechanisms for making a collection of techniques available for use by applications. By using interactive technique toolkits, a consistent look and feel among applications sharing a common WMS can be insured. For instance, the menu style used to select window operations should be the same style used within all applications. Basic elements of the toolkit can include menus, dialog boxes, scroll bars, file selection boxes and the like, all which can conveniently be implemented in windows. Interactive technique toolkits are available for specific WMSs. Widely used toolkits include the Andrew Window Management Systems Toolkit, the Macintosh™ Toolkit, OSF/Motif and Inter-Views toolkits implement Open/Look and both X Windows and News, Presentation Manager™ and the Sun View Window Management Systems Toolkit.

Turning now to the present invention, FIG. 1 schematically illustrates an example of an overall system arrangement of a workstation that includes a multiwindow presentation controlling device usable in conjunction with the method of this invention and embodying a system on which the present method can be implemented. In this system, a keyboard 10 is provided as on means for entering information, such as various control commands, character data, and graphic data, which is used for information processing. The keyboard 10 is connected through an input controller 12 to main CPU 14 that performs various information processing.

Figure 3:
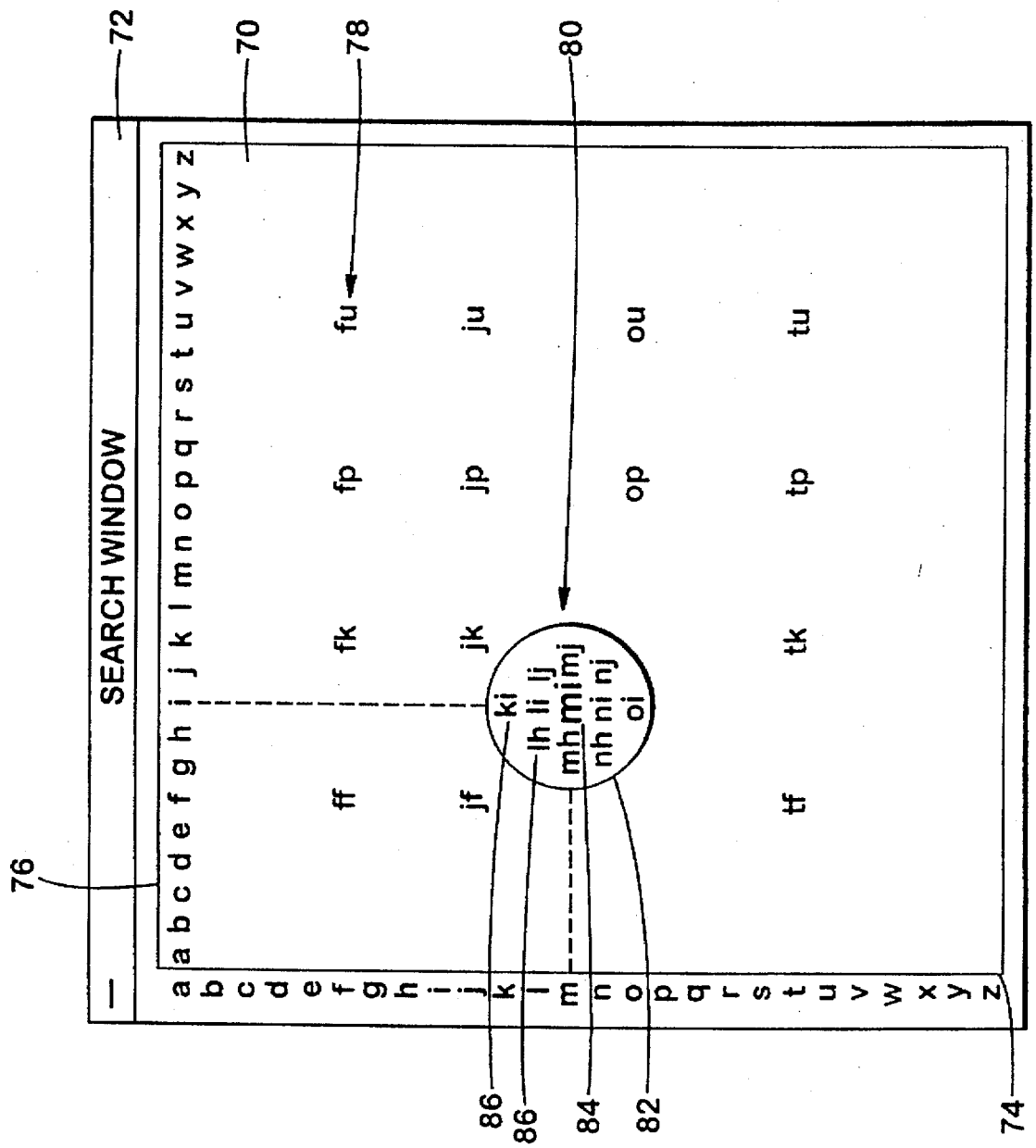
FIG. 3 illustrates a first embodiment of a search grid.

The workstation also includes a pointer-based device 16, constituted by a mouse, a tablet, or the like, with the preferred devices having associated with them one or more buttons designed to provide a mechanism for selecting screen objects such as window, grid elements, data sets, and the like. The pointer-based device 16 is provided as another means for entering information including various control commands, data selection, menu option selection, and the like invocable through pointer-based device positioning and button activation. When the pointer-based device 16 is rolled or moved on a flat surface (not shown) by an operator, a pointer image or a cursor (indicated by the fish-eye of FIG. 2 or the box of FIG. 3) displayed on the display screen S of a CRT display unit 18 moves accordingly to desired coordinates on the screen S or a desired screen location. In the case of a grid as illustrated in FIGS. 2 or 3, the cursor would be used to select a desired grid element. With the use of the pointer-based device 16, therefore, it is possible to easily and quickly specify any desired screen coordinate or location and/or select any desired functional element on the display screen, such as a menu option, a grid element, or a scroll list of search hits.

The pointer-based device 16 is connected to a cursor position calculator 20, which calculates the coordinates of the cursor on the display screen S of the CRT display unit 18 substantially in real time in accordance with the movement of the pointer-based device 16 on the flat surface, and generates cursor position data. The cursor position data is supplied to a cursor image controller 22, which is connected to a cursor image pattern generator 22 and a refresh image memory 26, which may be a bit-mapped memory serving as a video RAM. The refresh image memory 26 has a memory space corresponding to one display screen of the CRT display unit 18, and is connected to the display unit via a typical display controller 28.

The cursor image controller 26 writes a cursor image pattern from the pattern generator 24 into the image memory 26 at a suitable memory address specified by the cursor position data. The cursor image written into the image memory 28 is displayed by display controller 28 at corresponding coordinates on the display screen S of the CRT display unit 18. Since the cursor display process by the cursor image controller 22 is performed substantially in real time (i.e., at a high speed), the cursor continuously and smoothly moves on the display screen in accordance with the movement of the pointer-based device 16 on the flat surface. Accordingly, the faster the pointer-based device movement on the flat surface, the faster the cursor movement on the display screen S.

The main CPU 14 and the pointer-based device 16 are connected to a window presentation controlling section 30, which carries out the general management of windows formed or opened on the screen S of the display unit 18 by the operator, using the pointer-based device 16. More specifically, in response to instructions from the operator or user, the window presentation controlling section 30 may (1) change the window-overlapping order to make any desired window active, (2) change the size of each window or (3) move it around on the screen.

The window presentation controlling section 30 has a random access memory (RAM) 32 to which the cursor position data from the cursor position calculator 20 is also supplied. The RAM 32 temporarily stores the output data of the cursor position calculator 20 as present-cursor position data; it also stores the last-cursor position data. When the cursor position data changes according to the movement of the pointer-based device 16 on the flat surface, the RAM 32 updates its contents so as to store new data from the cursor position calculator 20 as the present-cursor position data. One convenient format for storing cursor position data from the cursor position calculator 20 is in the form of a data table stored in the RAM 32. Obviously, the data table of the RAM 32 is updated with movement of the pointer-based device 16. Throughout the following description, the RAM 32 will be referred to as "cursor position memory."

The window presentation controlling screen 30 also has a window forming unit 34, connected to pointer-based device 16. When the operator or user enters data to define the position and the size of a new rectangular window to form or open that window using the pointer-based device 16, this data is transferred to the window forming unit 34. Based on the input data, the window forming unit 34 generates data to specify the new window. This data is supplied to a window managing unit 36. The window managing unit 36 refers to the windows opened already, and determines the window manner and the display priority for the new window. The window number and management codes representing the display priority are affixed to the received window-specifying data and are supplied to two RAMs 38 and 40.

The RAM 38 receives and stores that portion of the output data of the window managing unit 36 which are associated with the window number and the window size (i.e., coordinate data representing the coordinates of two corner points, which diagonally face each other on the display screen and define the area of the new rectangular window). Again it is convenient to store with data as a data table in the RAM 38. That is, the RAM 38 stores data representing the areas of the windows, window attributes, and associated window objects as the window appears on the screen S in the order the window are opened, defined, or created by the user. In the following description, the RAM 38 will be referred to as "window area memory."

The RAM 40 receives and stores that portion of the output data of the window managing unit 36 which is associated with the display priority. The display priorities of the opened windows on the screen S of the CRT display unit 18 are initially determined by the window managing unit 36 in such a manner as to coincide with the order they have been opened. As the RAM 40 stores data representing the display priority of each window opened on the display screen, it will be referred to as "window priority memory" in the following description.

For example, if the new window is given the display priority of "1" (the highest display priority) at the front most position on display screen S, its entire region is visible. A second window with a display priority of "2" that overlaps with the window having the priority "1" will lies behind the later one. Therefore, that portion of the window with the priority "2" which overlaps the window with the priority "1" is invisible. Additionally, a window with a display priority of "3," i.e., a priority lower than those having priorities "2" and "1," will have its portions that overlap the windows having the priority "2" or "1" lying behind those windows and thus those portions will be invisible on the display screen S.

The data in the window priority memory 40 which specifies the window having the highest display priority, (i.e., the active window) is supplied to the input controller 12. Consequently, the input controller 12 can manage in which window on the display screen S the information currently entered by the operator or user through either the keyboard 10 or the pointer-based device 16 is to be written.

An arithmetic and logic unit (ALU) 42 is connected to the cursor position memory 32 and the window area memory 38, so that it can access these memories. Accordingly, the ALU 42 receives the present-cursor position data that is always updated, from the memory 42 over a signal line 44, and receives the position data of all currently opened windows on the screen S, from the memory 38 over a signal line 46. Based on the output from the memories 32 and 38, the ALU 42 automatically detects, in real time, in which window on the display screen S the cursor lies.

Specifically, the ALU 42 compares the present position data of the cursor with the coordinate data defining the position and the size of all currently opened windows, sequentially. Here, the ALU 42 correlates the present-cursor position data, usually in x and y coordinates, with position data that define each rectangular window on the display screen S, usually two corner points (upper left and lower fight), and determines whether the cursor has moved within a given window or has moved from one window to another. When the ALU 42 detects a change in the window which contains the cursor, it generates a detection signal 48.

Moreover, the ALU 42 also correlates the cursor position data with specific attributes and objects associated with the window that are stored in the window area memory 38. These attributes and objects can include menu options, grid elements, hits list selections, hot spots, and the like. Thus, the user can move the cursor not only to select which window is active, but also to invoke actions associated with the windows by positioning the cursor at a desired location in a given window. Depending on the window location, the ALU 42 will either directly activate an associated set of instructions for processing on the CPU 14 or secondary CPU or await user selection of an action through the use of the pointer-based device buttons. Thus, in response to a change in cursor position and/or activation of a pointer-based device button, the ALU 42 generates the detection signal 48 representing the associated change in state, i.e., change in active window, selection of a grid element, selection of a window object such as a menu option, or the like. This signal 48 is transferred to the main CPU 14 or to a sub CPU 50.

The main CPU 14 or the sub CPU 50 then performs internal control operations necessary for automatically executing the desired active. Which of the CPU's is used may depend on the type of action requested, on the number of instruction associated with the action, or other routing criteria for maximizing system efficiency. Of course, the new state of the system will be manifest in the window priority memory 40.

The sub CPU 50 is connected to the window priority memory 32 as well as to the refresh image memory 26. Upon completion of rewriting the contents of the window priority memory 40, the sub CPU 50 secures a memory region in the image memory 26 that corresponds to the position and the size of the currently-active window and all other opened windows.

Information and/or instructions in the form of character data and/or graphic data entered by the user using either the keyboard 10 or the pointer-device 16 are temporarily stored in an initial data memory 54 of the window presentation controlling section 30 through a data bus 52 for keyboard entered information and through a data bus 56 from sub CPU 50 for point-based entered information. Depending on the type of information entered, sub CPU 50 accesses memory 54 and read outs from the memory the information (e.g., character data, menu selections, window object and/or attribute selection, etc.) that has been entered and is either to be written on or in a given window or is being retrieved from the activation of some window object like a grid element of a grid. The entire read-out information is transferred, under the control of the sub CPU 50 or the main CPU 14, to the refresh image memory 26 and stored in the memory region there that has been secured for the active window. In a similar manner, information entered by the user from either input device will cause the system to execute the need instructions to modify the display screen or to update the display screen with additional windows or options depending of the information entered by the user. For example, if the user positions the cursor in the grid shown in FIG. 3 and selects the boxed grid element, the system of the present invention will relate the cursor position to the window coordinates to determine the grid element selected and transfer the information represented by the grid element to the main CPU 14 or the sub CPU 50 for the construction of the search query, generate the instructs necessary to execute the search on the data set, and to display the search results on the display screen S of the CRT 18.

For example, some hardware may be replaced where necessary by software program as needed, without departing from the basic technical principle of the aforementioned auto-window presentation. In this example, it is likely that the active window switching speed can be increased by improving the processing ability of involved CPUs. Further, ALU 42 is not restricted to perform the correlation between the present-cursor position data with the window coordinate data defining the position and the size of each window, only in the aforementioned manner; this correlation may also be modified in various ways.

Referring to the flow diagram of FIG. 2, the sequence of operational steps for the generation and display of a search grid executed by a program implementing the method of the present on an appropriate computer system, begins with the step 60 which provides for a user selection of a data set to be searched. For purposes of the present invention, data set selection is accomplished either through the use of a menu or through the use of appropriate keyboard commands. Menu selection is generally performed by using the pointer-based device 16 to activate appropriate menu selections that will cause a data set to be identified and opened for read access using the appropriate system hardware described above by executing instructions sufficient to access the data set stored on the system or on an associated mass storage device or a computer or mass storage device networked to the system described above.

Once the data set has been selected in accordance with the step 60, the method of the present invention scans the data set to determine its type and to accumulate the appropriate search keys for grid generation as shown in step 62. If the data set is text, then the method generates a 2-grid where each grid element represents a letter-pair (e.g., aa ... zz). For other types of data sets, the program provides the user with menus for setting the keys for grid generation and for selection of the dimensionality of the grid.

For non-textual data sets, the present invention will scan the data set to determine its type and the accumulate the appropriate search keys. This task can either be accomplished by asking the user information about the data set so that the user could participate in search key identification and selection or the data set itself could have that information in a structure associated with the data set. Such as structure may come from the type of data base used to store the data set or to store information about the data set. Alternately, the present system could have associated with it a routine that would convert a pre-existing non-textual data set into a data set having a preamble which contains the appropriate keys for the data set. Such as routine could be user driven to allow the user to tailor search key selection. For an example, suppose the data set is a graphical data base containing different collections of graphic primitives (circles, lines, rectangles, hearts, stars, etc.), then the search keys could simply be the graphic primitives or some user defined combination of the graphics primitives. As another example, the data set could be a collection of spectra such as voice prints, analytical spectra, or the like, then the search keys could be certain spectra features such as band shape, line shape (gaussian, lorentzian, etc.), intensity, etc. or a set of user defined search keys.

Next, step 66 takes the data set type information and generates a grid based on the information. The grid generation step 66 can generate grids of different formats which can be specified by the user either before grid generation or after grid generation. Of course, modifications to the grid format after grid display would require updating the displayed grid. The grid format can include defining the type of magnifiers associated with the cursor used to scan the grid, the type and frequency of grid index queues, axis labels, and other similar features.

Following the grid generation step 66, the generated grid in a display window of a display device 18 according to grid display step 68. The window allows the cursor associated with the pointer-based device 16 to be moved throughout the grid. The cursor can have associated with it certain enhancement features such as grid element magnification, grid area magnification, or other features to aid the user in query formulation. The cursor itself can be of any form including, without limitations, cross-hairs, arrows, hands with pointing fingers, mouses, or other such visual form.

If the selected data set is of a type that is amenable to numerous key sets and therefore multiple dimensional grid constructions, then the method of the present invention can include a key and dimensionality request step 64 that would allow a user to select the keys and grid dimensionality of query construction and data set searching.

Referring to FIG. 3, a displayed grid 70 is shown depicting one embodiment of a 2-grid for a pointer-based query formulation procedure of the present invention as it relates to alphabetic data as generated and displayed by the flow diagram depicted in FIG. 2. The grid 70 is displayed in a window 72. The grid 70 includes vertical and horizontal labeled axes 74 and 76 and visual index queues 78 to aid users in understanding the layout of the grid 70 and to aid in grid element selection. FIG. 3 also depicts a cursor 80 having a fish-eye magnifying circle 82 associated therewith. The cursor 80 is shown associated with a grid element 84 representing the key-pair "mi." The fish-eye circle 82 associated with the cursor 80 magnifies not only the grid element 84, but also all adjacent grid elements 86. Thus, the fish-eye circle 82 allows the user not only to view the current cursor location, i.e., grid element, it also allows the user to view all adjacent grid locations.

Figure 4:
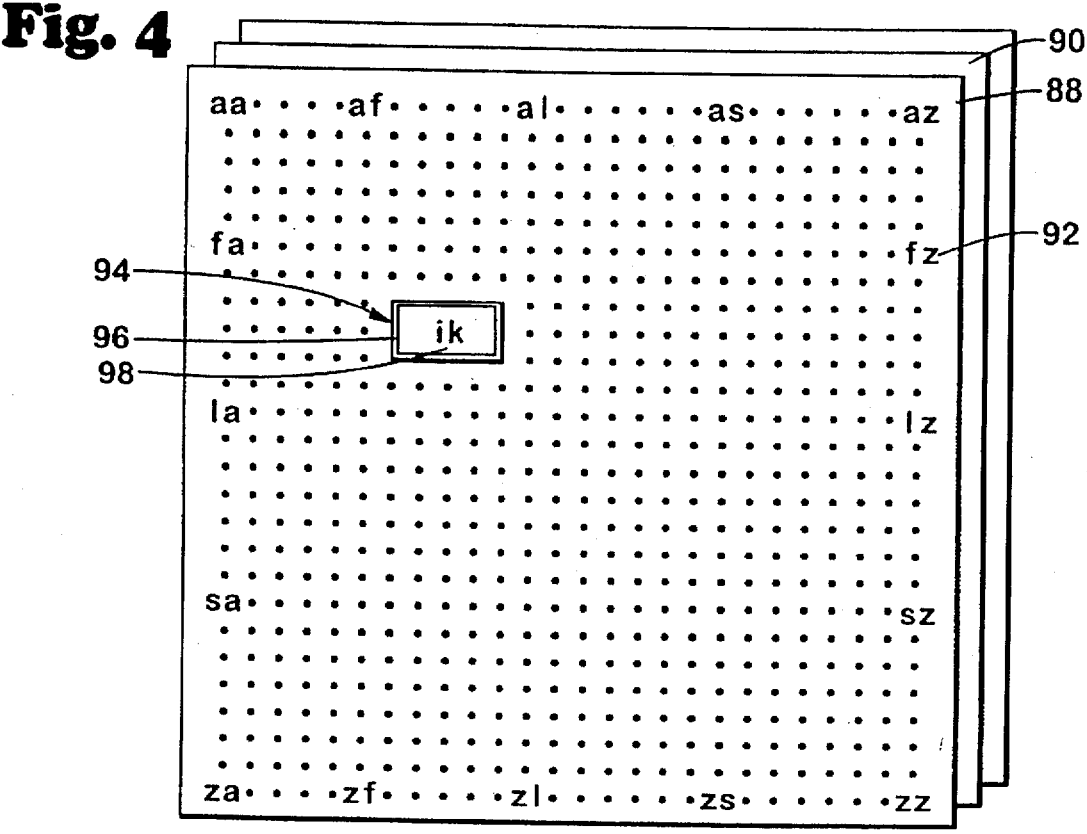
FIG. 4 illustrates a second embodiment of a search grid.

Referring to FIG. 4, a displayed grid 88 is shown depicting a second embodiment of a 2-grid for a pointer-based query formulation procedure of the present invention as it relates to alphabetic data. The grid 88 is displayed in a window 90. The grid 88 includes visual index queues 92 to aid users in understanding the layout of grid 88 and to aid in grid element selection. FIG. 4 also depicts a cursor 94 having a magnified grid element box 96 associated therewith. The cursor 94 is shown associated with a grid element 98 representing the key-pair "ik." The magnified grid element box 96 associated with the cursor 94 magnifies the grid element 98. Thus, the magnified grid element box 96 allows the user to view the current cursor location in a magnified context.

Of course, one of ordinary skill in the art should understand that other cursor grid element position identifiers can be use in place of the fish-eye and magnified box of FIGS. 3 and 4. Such alternate cursor grid element position identifiers can include, without limitation, cross-hairs, arrows, hands, fingers, rectangular multi-element box magnifiers, oval multi-element magnifiers, and the like.

Besides the basic ability to construct key-pair search queries using only the pointer-based device 16 by using the grids of the present invention, the present invention also provides a procedure that allows query refinement by increasing the number of keys in the query. The procedure provides that each grid element can also have associated with its magnified view window (activated by moving cursor into element with cursor type not to magnifying) a hot corner. This hot corner will allow users to further refine their search query by updating the grid so that the selected key-pair appears in combination with one or more addition keys in the appropriate sequence.

The optional and additional feature can be best represented by reference to the flow diagram of FIG. 5 where the additional functionality is shown in a sequence of operational steps for the refinement and generation of a restricted grid executed by a program implementing the method of the present on an appropriate computer system. The additional method steps begins with the step 100 which provides for a user selection of an element magnifier box associated with the cursor. The box selector step 100 is only required if the cursor currently being used does not support a hot corner. Next, the operational step 102 provides for user manipulation of the cursor and selection of a grid element using the point-based device buttons, i.e., clicking on a given element. The click would freeze the box in step 104 so that the cursor could be moved inside the box. The use can then manipulate the cursor to active a hot corner of the box as described in step 106. The activation of the hot corner then allows the method to generate a restricted grid through restricted grid generation step 108. The restricted grid generation step 108 cause the program implementing the method of the present invention to generate a grid having grid elements that incorporate the selected key-pair as part of the key-string represented by each grid element. In the case of alphabetic restricted grids, the new grid elements would consist of strings of 3 and 4 letters all containing the selected key-pair. Of course, the location of the selected key-pair can be user defined and can be a prefix or suffix or embedded. After internal generation of the restricted grid according to the step 108, the grid window would be updated to display the new grid in update grid step 110.

Of course for those computers that use single buttoned pointer-based devices, this functionality could be activated by a menu option that would allow cursor moved and a single click to allow the magnified element to be fixed so that the cursor could be moved within the magnified element and the hot corner activated.

Figure 6A:
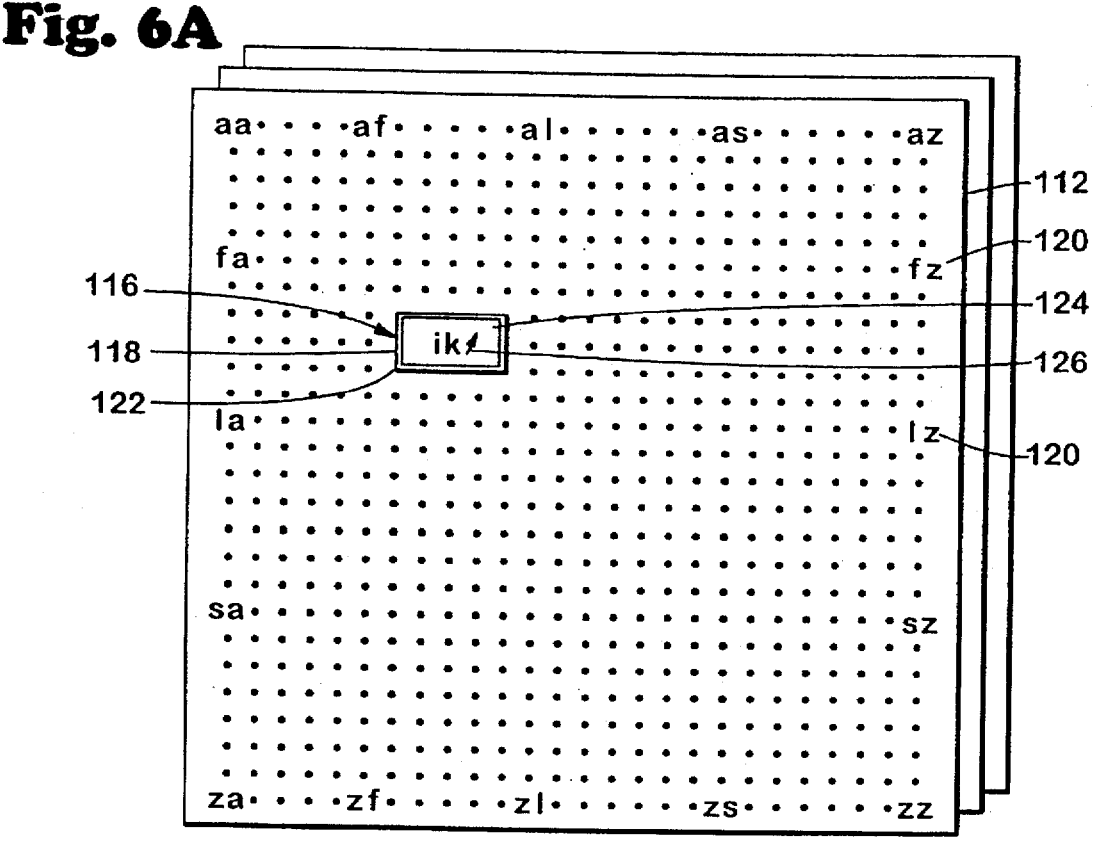
FIGS. 6A–6B illustrate the results of the refinement procedure of FIG. 5.
Figure 6B:
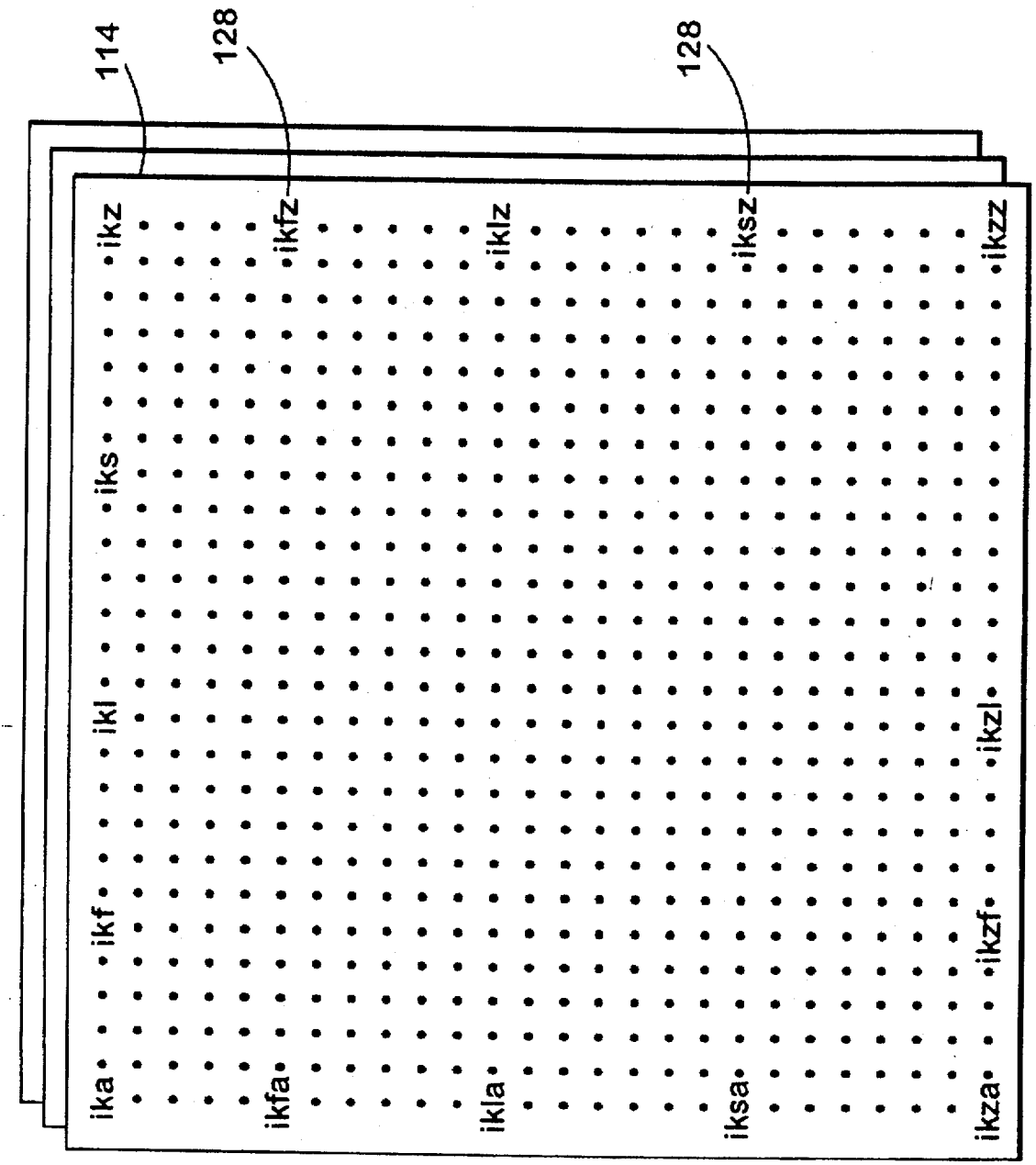

Referring now to FIG. 6, before and after grids 112 and 114 are illustrated for a text refined query. The alphabet grid 112 is shown with the selected grid element 116 representing the key-pair 118. The grid 112 is also shown with associated visual index queues 120 to aid users in understanding the layout of the grid 112 and to aid in grid element selection. The selected grid element 116 has associated with it a magnified box 122. The magnified box 122 has associated with it a hot corner 124 that when activated by the user by moving a cursor 126 represented as an arrow inside the box 122 to the corner 124 will generate a restricted grid utilizing the key-pair "ik" as the first letters in each new grid element. The new grid 114 will contain grid elements that consist of all 3 and 4 key strings starting with "ik", i.e., ika→ikz, ikaa—ikaz—ikzz as shown by visual queries 128.

Of course, the user would have to freeze the magnified box 122 by either typing on the keyboard a key or set of key strokes that freeze the box 122 or select the freeze box option from an appropriate pull down menu. Besides the use of a hot corner for query refinement, the box 122 could be an active view port or an active window.

An active view port or window has the attributes of any other window in that once the window is activated the user can issue instructions to the window by keyboard entries which cause routines associated with the active window to be invoked. For example, the user could sue the cursor to locate a desired grid element when the cursor has an active view port or window associated with it. Once the desired grid element is located, the user could either use the pointer button or the keyboard to select the element and/or refine the search. For example, the user could move the cursor to a desired grid element, click once to select and twice to refine or the user could type a keyboard instruction such as cntl-s to select and cntl-r to refine.

Of course, one of ordinary skill in the art should understand that other procedures for query restriction can also be utilized according to the method of the present invention. Such alternate methods for query restriction and the generation and display of restricted grids can include, without limitation, pull down menus that are activated with a grid element is selected such that the menu options would allow the user to appropriately restrict the query, and the like. Additionally, this restriction process could be repeated to further refine the search query. For alphabetic data, such restricted queries could find utility in root identification in manuscripts, and in non-alphabetic data such as graphic data or alphanumeric data, the restrictions could greatly simplify the search results and allow for greater flexibility in lowering resource allocations in performing the search.

Figure 7:
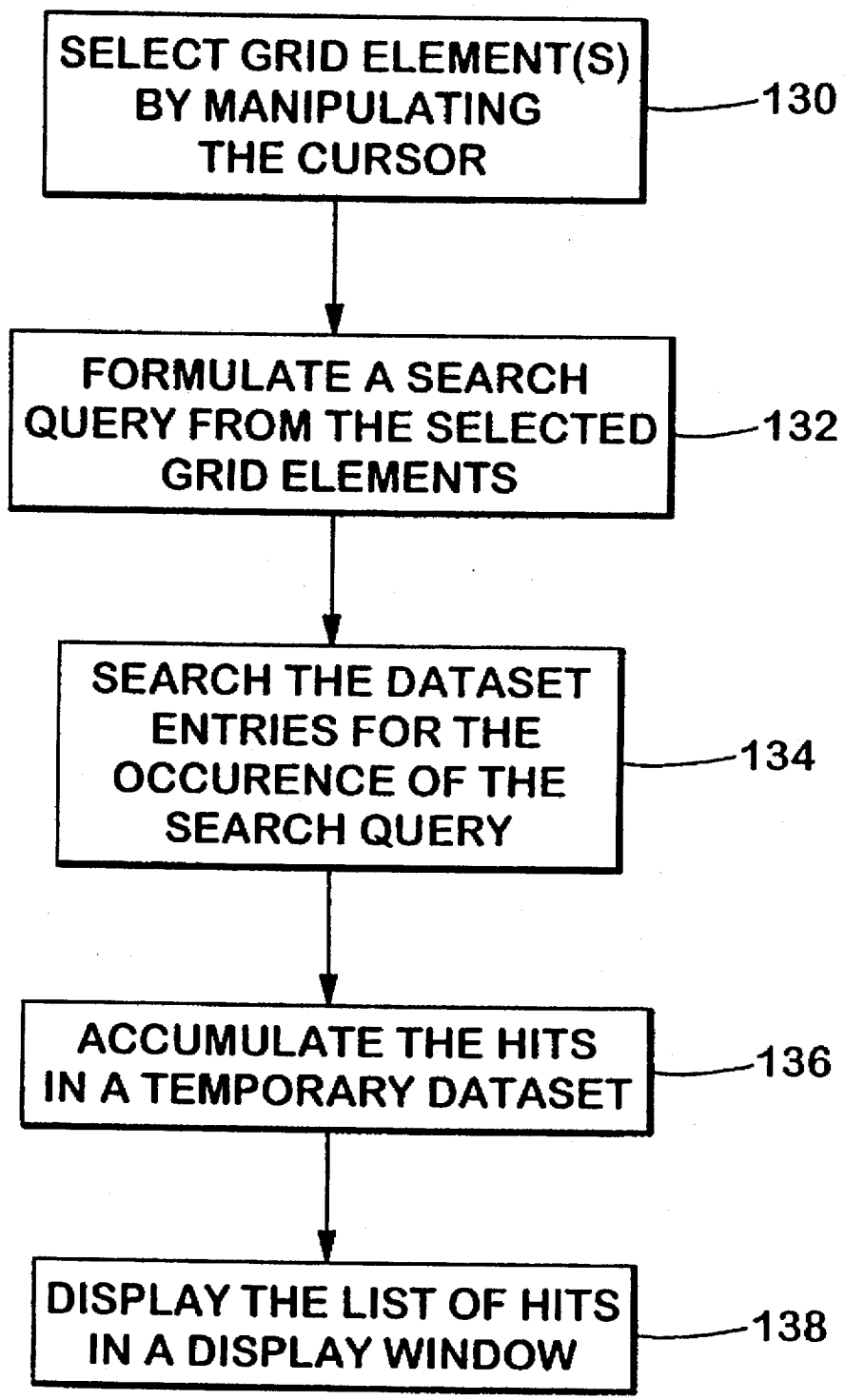
FIG. 7 depicts a flow diagrams for search query construction.

Referring to the flow diagram of FIG. 7, the sequence of operational steps for the completing the search methodology of the present invention are described for execution by a program implementing the method of the present on an appropriate computer system. The diagram of FIG. 7 begins with the step 130 which provides for a user selection of a grid element or elements for query formulation by user manipulation of the point-based device thereby moving the cursor in the grid and selection of the desired grid elements by clicking the pointer-device button or equivalent cursor activation means. Multiple selection can be made by using single clicks to selected and a double click to finalize the selection.

The selection of multiple grid elements can be used prepare Boolean search queries where the key-pairs represented by the selected grid elements. Thus, selection of the grid element representing the key-pair "st" could be concatenated with a second key-pair such as "ra" to from a search query of "stra." Other search queries can be formulated by anding or oring the selection together so that the data entries located by the search would be restricted to data entries having either one or both of the key-pair present. Such functionality could be menu based for ease of user manipulation or pre-set prior to grid generation.

Once the grid element or elements are selected, a query formulation step 132 is performed. The formulation step 132 takes the key-pair information represented by the selected grid elements and formulations the appropriate search query. In the case of a text based data set and a single key-pair selection such as the grid element representing the key-pair "ik" as shown in FIG. 4, the step 132 would formulate a search to find all data entries containing the key-pair "ik." Of course, the search can be restricted to the occurrence of "ik" only in the first two letter locations of the data entry or can be generalized to the occurrence of "ik" anywhere in the data entry or in any other fashion desired by the user. Such refinements can be built into menu selections activated during query formulation or pre-set prior to grid generation.

Next, the method of the present invention takes the query formulation of the step 132 and searches the data set using the query in a search step 134. The search step 134 performs the necessary comparisons of the key strings contained in the data entries to flag or otherwise mark the data entries that satisfy the query. Once the data entries are identified by the search step 134, the identified entries satisfying the query are accumulated into a temporary data set in a entry accumulation step 136. The temporary data set created by the accumulation step 136 contains all the hits identified by the search in the order in which they were located. Depending on the technique used to perform the search of step 134, the hits, i.e., the data entries satisfying the query, may be in a less than desirable order. Search techniques using parallel architecture may accumulate hits in orders different from the order of the data entries in the original data set. Such data order artifacts can be easily remedied by performing optional sorts prior to the display of the query hits.

Finally, the accumulated hits, sorted or not, are displayed in a window on the display different from the grid window in a hit display step 138. The display step 138 displays the hits in the window in a user friendly manner so that the hits can be individually pursed by the user. The hit display window can be include features that allow the user to select a given hit for use in associated programs such as letter generators, games, database construction, etc.

Referring to FIG. 8, a labeled search display window 140 is illustrated embodying a tailors search structure employing the method of the present invention. The window 140 includes a display label 142, three grids 144, 146, and 148 having three associated labels 150, 152, and 154, respectively. Each grid contains a selected grid element 156, 158, and 160, respectively. The selected grid element 156, 158, and 160 represent the key-pair "TU", "DE", and "DA", respectively, which are displayed in visual aid selected grid element windows 162, 164, and 166, respectively, with associated labels selected grid element 168, 170, and 172, respectively. The search hits resulting from a query construction based on the selected grid elements 156, 158, and 160, are displayed in three scannable windows 174, 176, and 178 located beneath their associated grid 144, 146, and 148.

The window 140 also has associated with it a cancel box 180 and a help box 182. Of course, the window 140 could also have one or more menus associated with it to allow user control of grid attributes, query formulation, and other functionality as described above.

The window 140 represent a search construction using the method of the present invention that is directed to data that is either stored as multiple files or is associated with data-based information. The search structures depicted in FIG. 8 consists of three separate grids which require element selection. Once the selections are made the appropriate query is formulated for identifying all last names that begin with the grid element 156 of grid 144, all first names that begin with the grid element 158 of grid 146, and all cities that begin with the grid element 160 of grid 156. Thus, the methodology of the present invention can be used to search one or more data sets or one or more data fields in a given data set. Of course, the selection of a given data set will dictated the type of user interface (display window) employed and the type of user definable functions associated with the interface. However, the interfaces can consist of information similar to the information and layout shown in FIG. 8.

While in accordance with the patent statutes, the best mode and preferred embodiments of the invention have been described, it is to be understood that the invention is not limited thereto, but rather is to be measured by the scope and spirit of the appended claims.

We claim:

1. A method for searching a large volume of data with a pointer-based device comprising the steps of:
   a. selecting a data set to be searched using the pointer-based device so that the data set becomes accessible to a CPU memory associated with a CPU;
   b. generating an n-grid of n-tuples of keys associated with the data entries in the selected data set in the CPU memory;
   c. displaying the n-grid in a display window associated with a display device attachably engaging the CPU memory where the n-grid comprises a plurality of grid elements comprising the n-tuples of keys;
   d. selecting one or more n-tuples with a cursor associated with the pointer-based device by manipulating the cursor within the n-grid by activating a selection mechanism associated with the pointer-based device;
   e. formulating a search query based on the selected n-tuples;
   f. searching the data set with the formulated query to identify each data entry that contain the selected n-tuples;
   g. retrieving the identified data entries; and
   h. displaying the identified data entries in a second display window associated with the display device for review by a user.

2. The method of claim 1, wherein the data set is a text based data set.

3. The method of claim 2, wherein the n-grid is a 2-grid and wherein the n-tuples are pairs of letters.

4. The method of claim 1, further comprising the steps of:
   i. refining the search query by activating a n-grid refinement,
   j. generating a refined n-grid comprising refined tuples containing all associated trinary and ternary combinations of the selected n-tuple and all other n-tuples associated with the original n-grid;
   k. displaying the refined n-grid in another display window on the display device; and
   l. repeating steps d–h.

5. The method of claim 4, wherein the data set is a text based data set.

6. The method of claim 5, wherein the n-grid is a 2-grid, wherein the n-tuples are pairs of letters, and wherein the refined tuples contain the selected letter pair and all trinary and ternary letter combinations.

7. The method of claim 4, wherein the refinement is activated by the cursor which includes a set of enhancement features.

8. The method of claim 7, wherein the set of enhancement features comprises as a grid element magnifier and at least one hot corner.

9. The method of claim 7, wherein the set of enhancement features comprises as a grid area magnifier and where the area magnifier is an active window.

10. A method for searching a large volume of data with a pointer-based device comprising the steps of:
   a. selecting a data set to be searched using the pointer-based device so that the data set becomes accessible to a CPU memory associated with a CPU;
   b. generating an n-grid of n-tuples of keys associated with the data entries in the selected data set in the CPU memory;
   c. displaying the n-grid in a first display window associated with a display device attachably engaging the CPU memory where the n-grid comprises a plurality of grid elements comprising the n-tuples of keys;
   d. refining the search query by activating a n-grid refinement;
   e. generating a refined n-grid comprising refined tuples containing all associated trinary and ternary combinations of the selected n-tuple and all other n-tuples associated with the original n-grid;
   f. displaying the refined n-grid in a second display window on the display device;
   g. selecting one or more refined tuples with a cursor associated with the pointer-based device by manipulating the cursor within the refined n-grid by activating a selection mechanism associated with the pointer-based device;
   h. formulating a search query based on the selected refined tuples;
   i. searching the data set with the formulated query to identify each data entry that contain the selected refined tuples;
   j. retrieving the identified data entries; and
   k. displaying the identified data entries in a third display window associated with the display device for review by a user.

11. The method of claim 10, wherein the data set is a text based data set.

12. The method of claim 11, wherein the n-grid is a 2-grid and wherein the n-tuples are pairs of letters.

13. The method of claim 12, wherein the refined tuples contain all trinary and ternary letter combinations of the selected letter pair.

14. The method of claim 13, wherein the refinement is activated by the cursor which includes a set of enhancement features.

15. The method of claim 14, wherein the set of enhancement features comprises as a grid element magnifier and at least one hot corner.

16. The method of claim 14, wherein the set of enhancement features comprises as a grid area magnifier and where the area magnifier is an active window.

* * * * *